(12) United States Patent
Stevens

(10) Patent No.: US 7,424,765 B1
(45) Date of Patent: Sep. 16, 2008

(54) REMOTE CONTROL WINDSHIELD WIPER

(76) Inventor: Geoffrey Stevens, 11 Beach La., Lakewood, WA (US) 98498

( * ) Notice: Subject to any disclaimer, the term of this patent is extended or adjusted under 35 U.S.C. 154(b) by 0 days.

(21) Appl. No.: 11/715,697

(22) Filed: Mar. 8, 2007

(51) Int. Cl.
- *B60S 1/18* (2006.01)
- *B60S 1/36* (2006.01)
- *B60S 1/44* (2006.01)
- *B60S 1/28* (2006.01)
- *B60S 1/56* (2006.01)

(52) U.S. Cl. .................. 15/250.29; 15/250.3

(58) Field of Classification Search .............. 15/250.3, 15/250.29, 250.11, 250.003, 250.001, 250.14, 15/250.21, 250.23, 250.19
See application file for complete search history.

(56) References Cited

U.S. PATENT DOCUMENTS

| | | | | |
|---|---|---|---|---|
| 2,031,297 | A * | 2/1936 | Anderson | 15/250.32 |
| 2,880,444 | A * | 4/1959 | Barenyi et al. | 15/250.29 |
| 3,448,480 | A * | 6/1969 | Couget | 15/250.001 |
| 4,316,303 | A * | 2/1982 | Penn | 15/250.3 |
| 4,670,934 | A | 6/1987 | Epple et al. | |
| 5,012,525 | A | 5/1991 | Kuhbauch | |
| 5,263,759 | A | 11/1993 | Brodie et al. | |
| 5,274,876 | A * | 1/1994 | Wehrspann | 15/250.17 |
| 5,410,774 | A * | 5/1995 | Adams | 15/230.1 |
| 6,161,248 | A | 12/2000 | Merkel et al. | |
| 6,315,478 | B1 | 11/2001 | Atkins | |
| 6,324,719 | B1 * | 12/2001 | Ritacco | 15/250.3 |
| 6,768,422 | B2 | 7/2004 | Schofield et al. | |

FOREIGN PATENT DOCUMENTS

JP 61-155043 * 7/1986

* cited by examiner

*Primary Examiner*—Gary K Graham
(74) *Attorney, Agent, or Firm*—Lawrence J. Gibney, Jr.

(57) ABSTRACT

This is a device that will allow an individual to remotely control the operation of a windshield wiper and/or a squeegee arm and blade independently of each other. It will be secured in a variety of methods to a window pane or window surface for the purpose of cleaning the window pane so that the individual may obtain maximum visibility. It will also be portable and light weight.

7 Claims, 6 Drawing Sheets

REMOTE CONTROL WINDSHIELD WIPER

BACKGROUND OF THE INVENTION

A. Field of the Invention

This relates to using a windshield wiper for the inside or the outside of a window. It may be used for the inside of a window when there are issues of fogging such as on a boat, heavy equipment vehicles, recreational vehicles or personal transportation. It is designed to be portable and operate both a wiper and a squeegee blade.

B. Prior Art

There are many other references to windshield wiper devices and windshield wiper blades. A representative example that can be found in the prior art includes Kuhlbauch, U.S. Pat. No. 5,012,525, which is a vehicle windshield wiper device. This device wipes the windshield of motor vehicles, using a wiping field located between two oscillating and reversing positions.

Another example in the prior art can be found at Brodie, U.S. Pat. No. 5,263,759, which is a vehicular window assembly with wiper support. This is not a portable wiper device, but it is simply a washing device for an automobile. A portable device that washes glass can be found at Atkins, U.S. Pat. No. 6,315,478.

There are many other prior art references, but none combine the various structural features that are found in this particular device.

BRIEF SUMMARY OF THE INVENTION

This is a portable windshield wiper. It may be used on the outside or the inside of a window. Windshield wipers, of course, wipe moisture and precipitation from window panes. This particular device will have a wiper blade as well as a squeegee blade. The wiper blade will oscillate in a back-and-forth motion, and the squeegee blade will operate in an essentially up-and-down motion.

The device can be controlled by a remote control device, which is operated by the user. The wiper and squeegee blades may be operated independently of each other or may be operated at the same time. A method to secure the device to a window pane is also provided in the form of suction cups. A gear mechanism inside a housing permits movement of the wiper blade and the squeegee devices.

The object of this device is to be able to remotely clean a windshield, then remove the device and clean the next windshield. It may be used in boats, recreational vehicles, large heavy equipment, and personal vehicles.

NUMBERING REFERENCE

Figure 1:
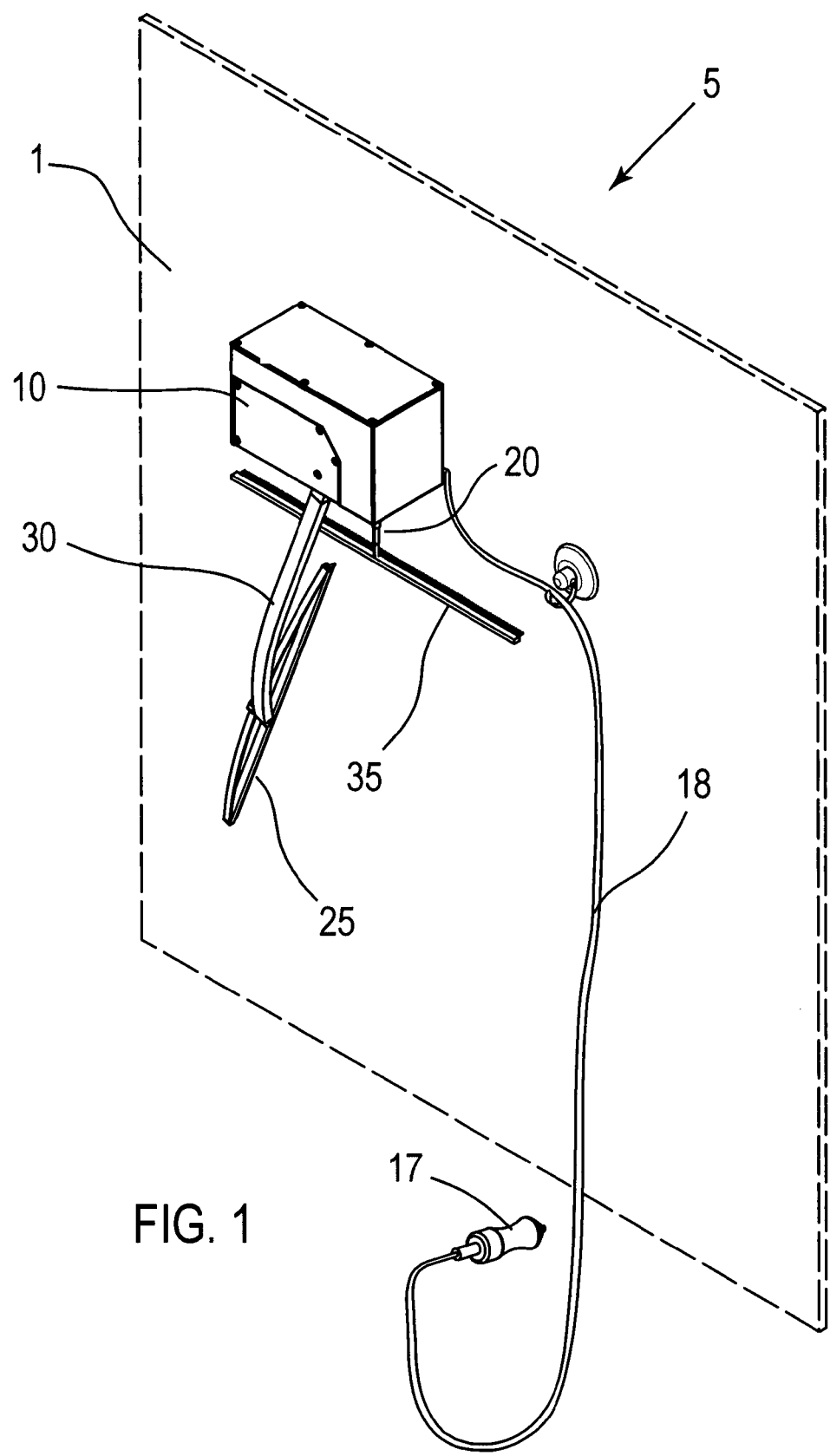
FIG. 1 is an isometric view of the device attached to a window pane.
Figure 2:
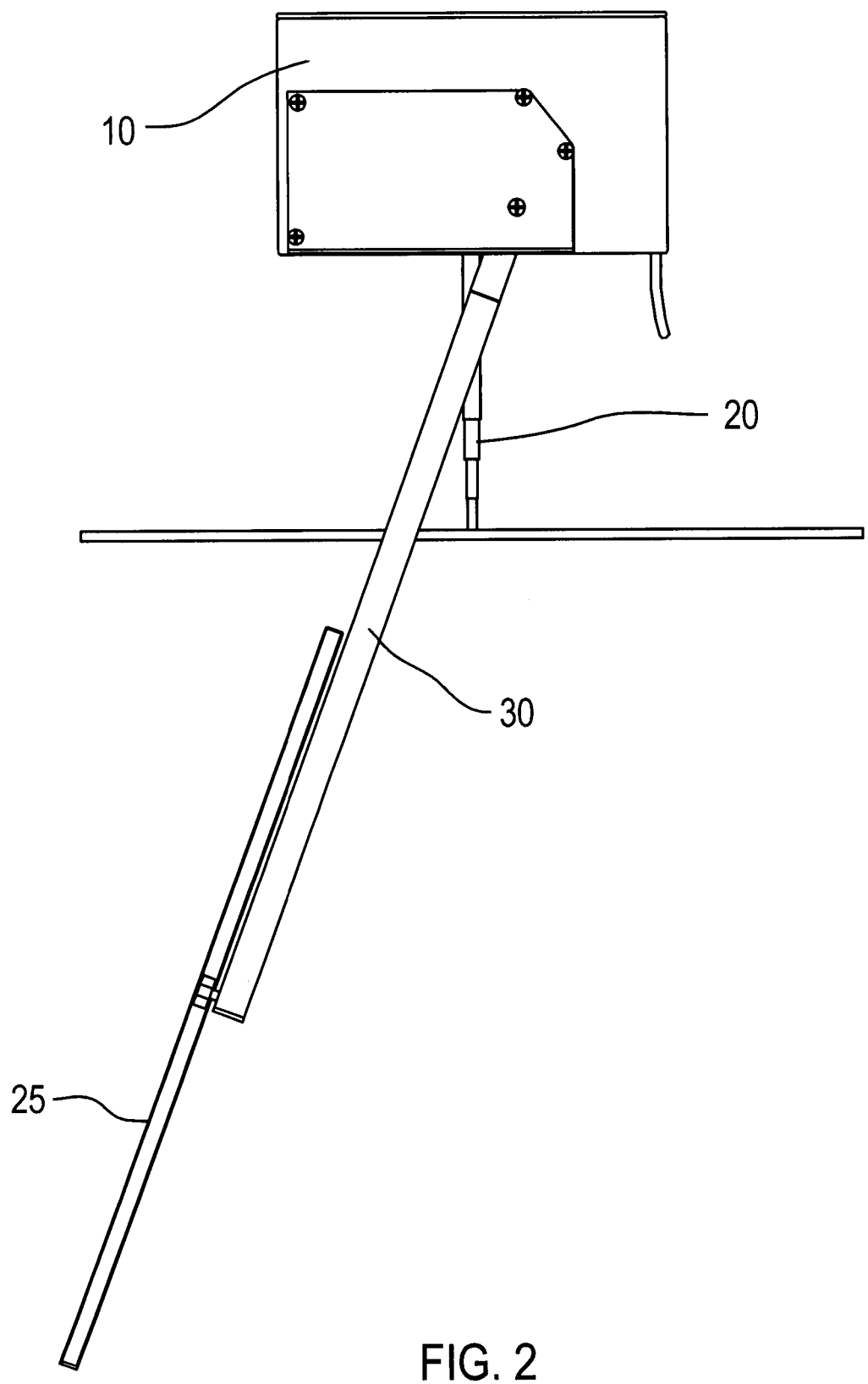
FIG. 2 is a front view of the device.
Figure 3:
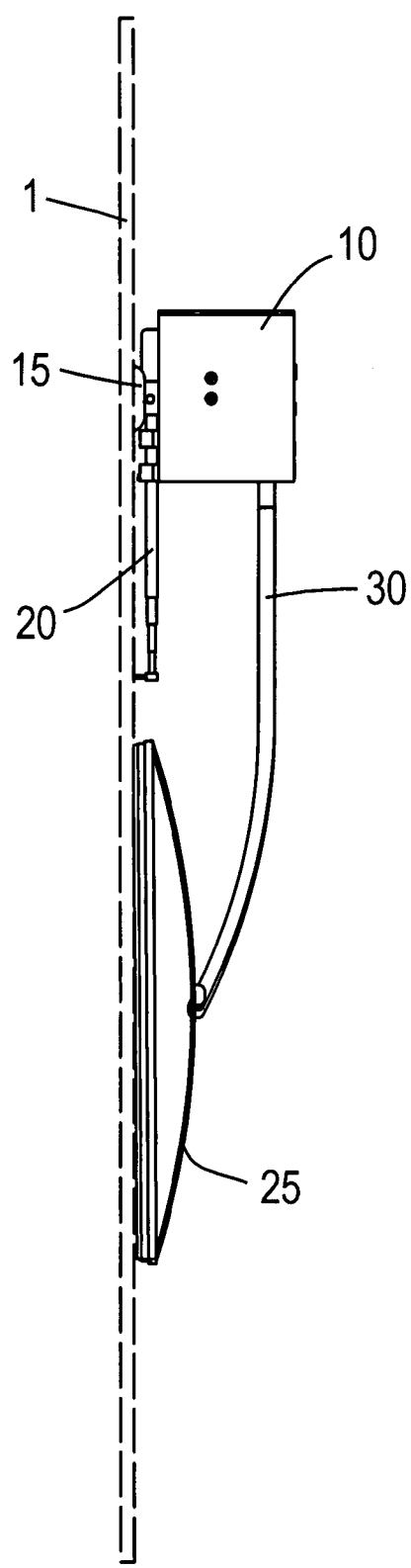
FIG. 3 is a side view of the device attached to a window pane.
Figure 4:
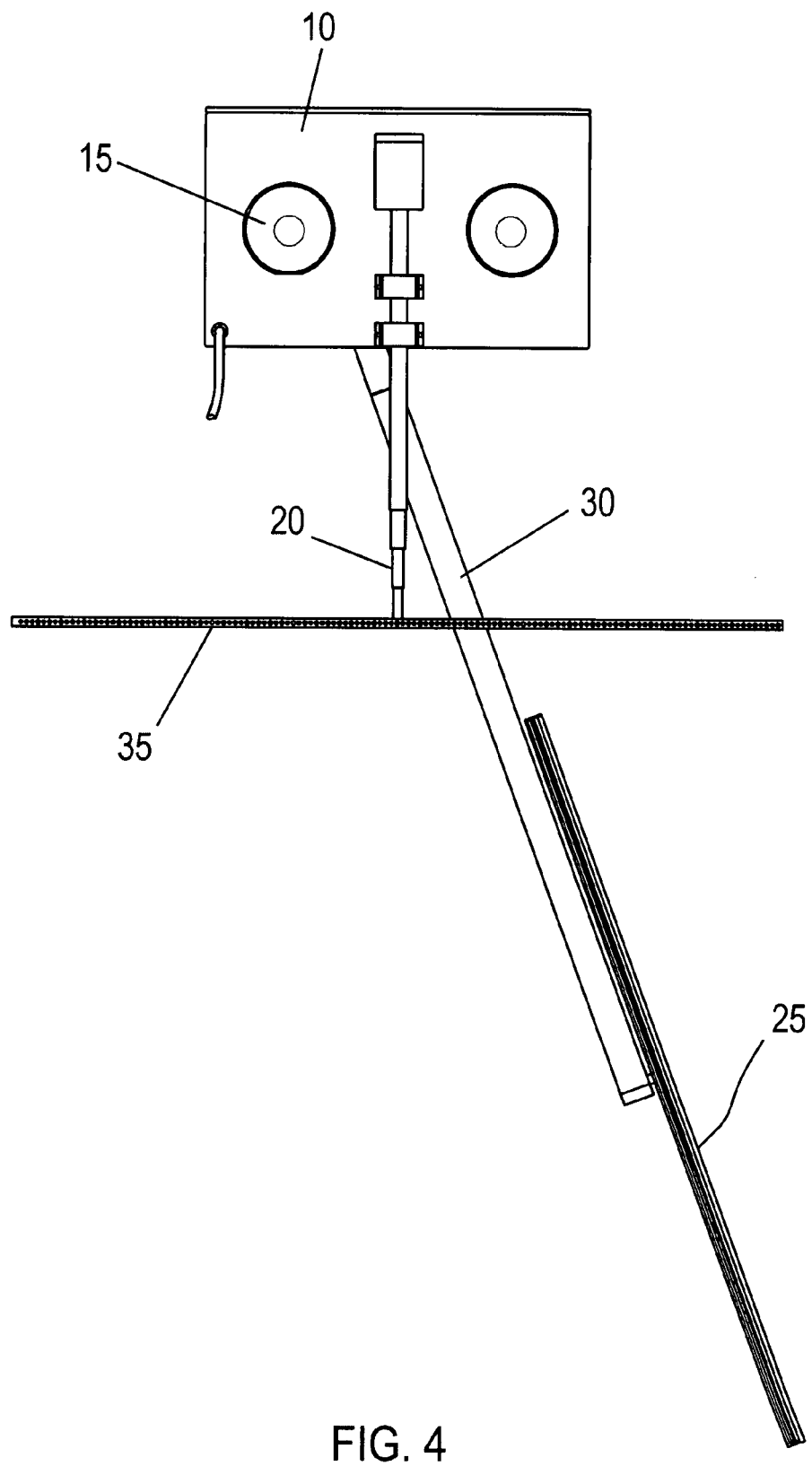
FIG. 4 is a back view of the device.
Figure 5:
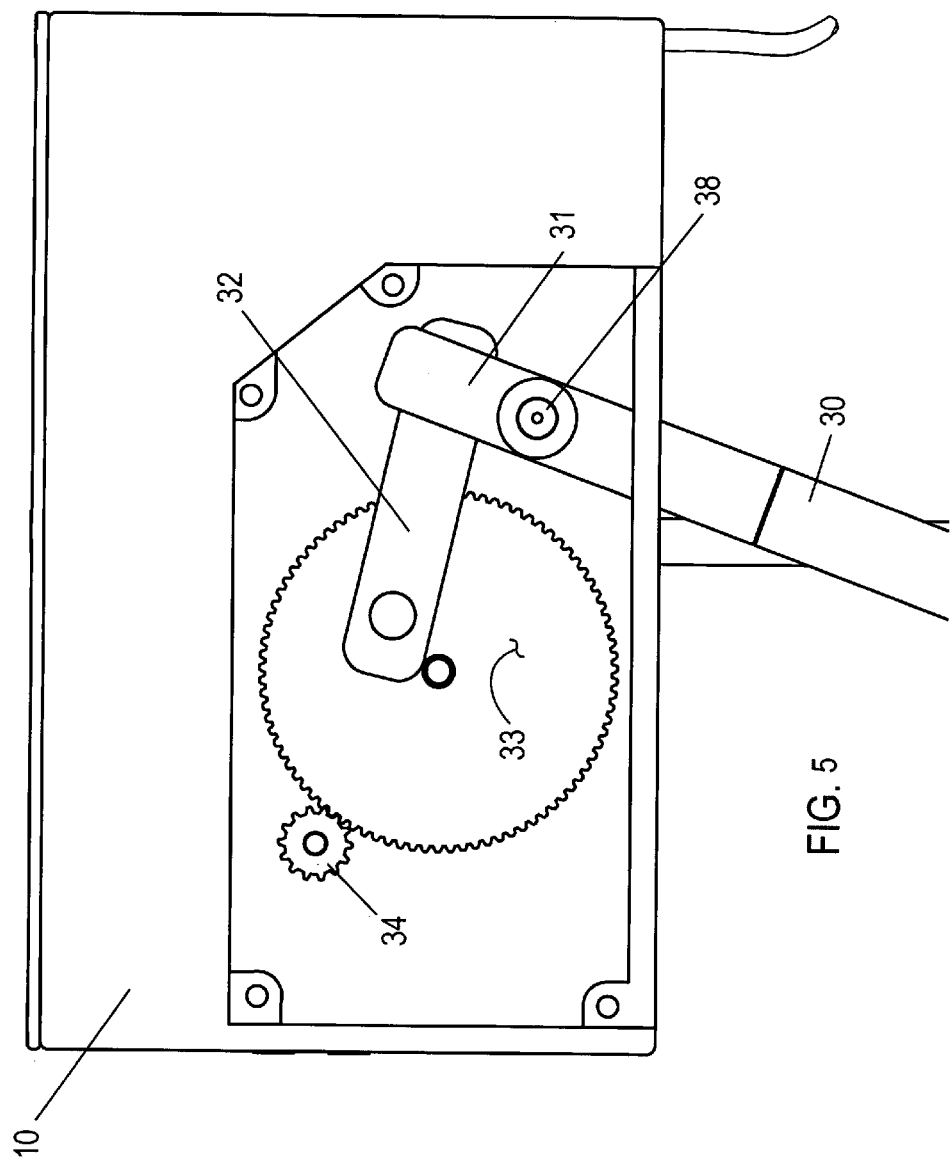
FIG. 5 is a front view of the gear and arm mechanisms used to operate the wiper.
Figure 6:
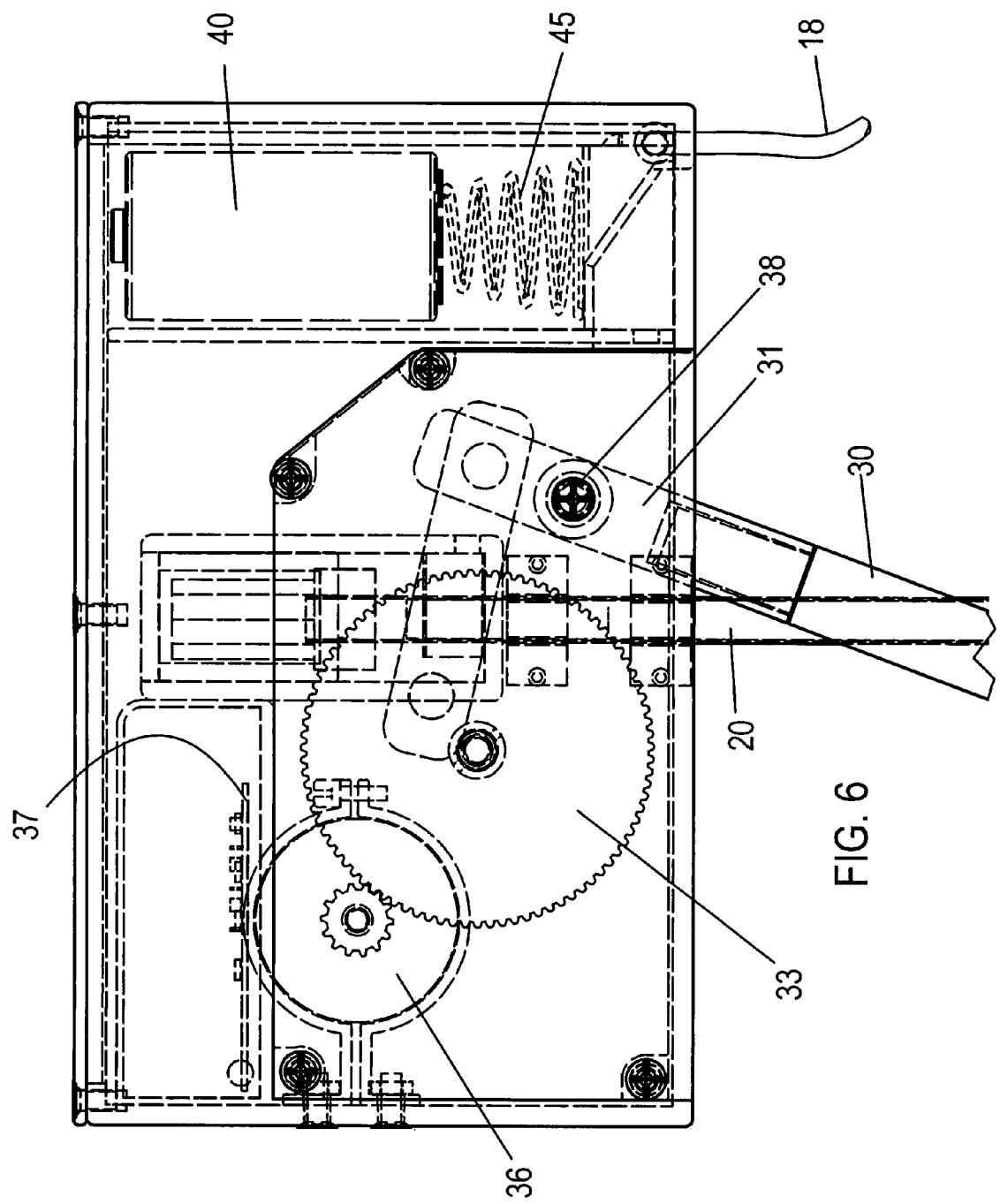
FIG. 6 is a front view of the gear and arm mechanisms with the other portions of the device indicated by dashed lines.

1 Pane
5 Device
10 Casing
17 Lighter insert
18 Wire
20 Squeegee arm
25 Wiper blade
30 Wiper blade arm
31 Driver arm
32 Wiper connecting rod
33 Crank spool
34 Drive gear wiper
35 Squeegee blade
37 Micro processor
38 Connection means
40 Power source
45 Spring

DETAILED DESCRIPTION OF THE EMBODIMENTS

This is a remote-controlled windshield wiper device 5. It will be a placed on a windshield or a pane of glass 1. In order to secure the device to the window pane, a series of suction cups 15 will be provided on one side of a casing 10. Within the casing will be internal gears with appropriate mechanical linkage that will connect a small motor to the wiper blade 25 and a separate squeegee arm 35.

The squeegee arm 20 is connected to the casing and appropriate mechanical linkage (not depicted). A telescoping arm is provided for the squeegee arm 20. With a remote control device that is not depicted, the user can operate the squeegee blade independently of the wiper blade 25 and can operate both the wiper blade and the squeegee blade 35.

Similarly, the wiper blade 25 is connected to the casing and appropriate mechanical linkage with a wiper blade arm 30. The wiper blade 25 and squeegee blade 35 operate independently of each other. Both the wiper blade arm and the squeegee arm may also telescope to provide the most efficient use and provide maximum range.

A power source 40 will also be provided, and it is anticipated that a battery, which is enclosed in the casing 10 and is kept in place by a spring 45, will be used. A means to access the power source is also provided. An appropriate microprocessor/receiver or controller 37 is provided to complete the circuit between the remote control device and the respective wiper and squeegee blades. In addition to direct current power, which is supplied by a battery 40 or plurality of batteries the device may also be operated by using the machine's lighter with the appropriate cigarette lighter adapter 17 and appropriate wire or cord 18.

A small motor 36, which is contained in the housing 10 turns a drive gear 34, which is connected to a crank spool 33. A connecting rod 32 is secured to the crank spool 33 so that when the crank spool 33 turns the connecting rod 32 will move. The connecting rod 32 is connected to the drive arm 31 for the wiper arm 30. The location of the connection point for the connecting rod 32 to be secured to the crank spool is slightly off center to insure appropriate movement of both the connecting rod, drive arm and wiper arm 30 as the motor turns the drive gear 34. The drive arm 31 is connected to the casing with a means to connect 38 such as a bolt. The drive gear 34 is likely to be a splined gear and likewise the crank spool is also likely to be splined. Other means to move the wiper blade assembly (although not depicted) such as a pulley arrangement may also be used to operate the wiper blade.

In operation, the user of the device simply depresses the appropriate control desired on the remote control device, and the wiper blade 25 and/or squeegee blade 35 will operate independently from each other. The wiper blade would essentially have a side-to-side motion, and the squeegee blade would have an up-and-down motion.

It is anticipated that this device will be made of lightweight material, and many choices of material are available. Additionally, many other types of means of securement may also be used, although suction cups are probably the most practical in most situations.

The invention claimed is:

1. A remote-controlled windshield wiper device, which is comprised of:
   a. a casing;
      wherein the casing houses a power source;
      wherein the casing houses mechanical linkage for a wiper blade arm and a squeegee blade arm;
      wherein a means to secure the casing to a window pane is provided;
   b. a wiper blade arm;
      wherein a wiper blade is secured to an end of the wiper blade arm;
      said wiper blade arm is connected to the casing;
      said wiper blade arm is linked by the mechanical linkage to an electric motor;
      said electrical motor is located in the casing;
   c. a squeegee arm;
      wherein the squeegee arm is connected to the casing;
      wherein the squeegee arm is placed in a telescoping tube;
      wherein a squeegee blade is connected to the squeegee arm;
   d. wherein wiring is provided linking the power source to the electric motor;
   e. wherein the electric motor turns a small drive gear;
   f. wherein the small drive gear is splined;
   g. crank spool;
      wherein an outer perimeter of the crank spool is splined;
      wherein the small drive gear meshes with the outer perimeter of the crank spool;
   h. connecting rod;
      wherein the connecting rod is secured to the crank spool;
      wherein the connecting rod is secured to a wiper drive arm;
   i. wherein the wiper drive arm has a first end and a second end;
      said first end is attached to the connecting rod;
      said second end is attached to the wiper arm;
   j. remote control device;
      wherein the remote control device is used to operate the wiper blade arm and squeegee arm.

2. The device as described in claim 1 wherein the means to secure is a plurality of suction cups.

3. The device as described in claim 1 wherein the tube for the squeegee arm can telescope.

4. The device as described in claim 1 wherein the wiper blade moves in an essentially side-to-side motion.

5. The device as described in claim 1 wherein the squeegee arm moves in an up-and-down direction.

6. The device as described in claim 1 wherein the connecting rod is offset a predetermined distance from a center of the crank spool.

7. The device as described in claim 1 wherein the power source is a battery.

* * * * *